(12) United States Patent
Yonezawa

(10) Patent No.: US 12,521,654 B2
(45) Date of Patent: Jan. 13, 2026

(54) END MATERIAL RECOVERY APPARATUS

(71) Applicant: Kioxia Corporation, Tokyo (JP)

(72) Inventor: Takafumi Yonezawa, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 414 days.

(21) Appl. No.: 18/333,779

(22) Filed: Jun. 13, 2023

(65) Prior Publication Data

US 2024/0091681 A1 Mar. 21, 2024

(30) Foreign Application Priority Data

Sep. 16, 2022 (JP) .................................. 2022-148127

(51) Int. Cl.
*B01D 29/35* (2006.01)
*B01D 29/92* (2006.01)
*B01D 29/94* (2006.01)

(52) U.S. Cl.
CPC ............ *B01D 29/35* (2013.01); *B01D 29/92* (2013.01); *B01D 29/94* (2013.01); *B01D 2201/36* (2013.01)

(58) Field of Classification Search
None
See application file for complete search history.

(56) References Cited

U.S. PATENT DOCUMENTS

| 147,758 | A | * | 2/1874 | Flanagan | A47J 43/22 209/258 |
|---|---|---|---|---|---|
| 1,249,491 | A | * | 12/1917 | Ramsay | B07B 1/00 193/31 R |
| 1,334,913 | A | * | 3/1920 | Lee | B60P 1/24 298/17.8 |
| 3,072,257 | A | * | 1/1963 | Hockenberry | E02F 3/404 209/421 |
| 3,412,883 | A | * | 11/1968 | Birdsall | B60P 1/36 298/7 |
| 3,486,648 | A | * | 12/1969 | Dewald | B66F 9/19 414/397 |
| 3,765,490 | A | * | 10/1973 | Logue | E02F 3/401 37/444 |

(Continued)

FOREIGN PATENT DOCUMENTS

| DE | 19758570 C2 * 10/2002 | ............ B65F 1/1447 |
|---|---|---|
| JP | 2007-075963 A | 3/2007 |

(Continued)

*Primary Examiner* — Robert J Popovics
(74) *Attorney, Agent, or Firm* — Foley & Lardner LLP

(57) ABSTRACT

An end material recovery apparatus includes a plurality of cages each in which an upper portion is opened, the plurality of cages each having at least one surface formed of at least one of a mesh-like surface and a porous surface, the plurality of cages being configured to receive a mixed liquid in which an end material is mixed with a liquid from the upper portion, collect at least a part of the end material in the mixed liquid, and discharge the liquid from the at least one surface; a rotation drive mechanism configured to individually rotate the plurality of cages in a direction in which the upper portion faces downward; and a plurality of recovery containers configured to recover the end material dropped by individually rotating the plurality of cages in the direction in which the upper portion faces downward.

20 Claims, 11 Drawing Sheets

(56) References Cited

U.S. PATENT DOCUMENTS

| | | | | |
|---|---|---|---|---|
| 3,899,311 A * | 8/1975 | Rapp | B05B 14/43 | 55/311 |
| 5,093,001 A * | 3/1992 | Ueda | B01D 33/66 | 210/403 |
| 5,241,764 A * | 9/1993 | Modig | E02F 3/407 | 37/405 |
| 5,310,302 A * | 5/1994 | Ferguson, Sr. | B66F 9/19 | 414/420 |
| 5,311,684 A * | 5/1994 | Van Dalfsen | E02F 7/06 | 37/417 |
| 5,323,939 A * | 6/1994 | Young | B65D 90/623 | 222/500 |
| 5,470,473 A * | 11/1995 | Park | B01D 33/60 | 210/402 |
| 5,528,844 A * | 6/1996 | Ellis | B01D 29/05 | 37/444 |
| 5,589,079 A * | 12/1996 | Park | B01D 33/76 | 210/791 |
| 5,647,989 A * | 7/1997 | Hayashi | B24B 57/02 | 210/651 |
| 5,743,030 A * | 4/1998 | Sirr | E02F 7/06 | 37/444 |
| 5,771,612 A * | 6/1998 | Lynch | E02F 3/405 | 172/40 |
| 5,772,900 A * | 6/1998 | Yorita | B01D 37/046 | 210/167.04 |
| 5,799,643 A * | 9/1998 | Miyata | B28D 1/025 | 451/60 |
| 5,830,369 A * | 11/1998 | Toyama | B28D 1/025 | 125/16.02 |
| 5,863,429 A * | 1/1999 | Bahr | B01D 25/285 | 100/118 |
| 5,897,775 A * | 4/1999 | Kihlstrom | B65F 5/005 | 210/406 |
| 5,961,827 A * | 10/1999 | Bahr | B01D 29/096 | 210/387 |
| 5,964,050 A * | 10/1999 | Svahn | E02F 3/40 | 37/409 |
| 5,975,108 A * | 11/1999 | Cho | H01L 21/67017 | 137/205 |
| 6,001,265 A * | 12/1999 | Toyama | B28D 1/025 | 210/171 |
| 6,053,158 A * | 4/2000 | Miyata | B28D 1/025 | 451/60 |
| 6,077,437 A * | 6/2000 | Hayashi | B01D 61/145 | 210/90 |
| 6,095,899 A * | 8/2000 | Elmar | B24D 7/10 | 451/28 |
| 6,106,728 A * | 8/2000 | Iida | B24B 57/02 | 438/692 |
| 6,135,865 A * | 10/2000 | Beardsley | B24B 57/02 | 451/285 |
| 6,161,533 A * | 12/2000 | Katsumata | B28D 5/007 | 125/16.02 |
| 6,183,352 B1 * | 2/2001 | Kurisawa | B24B 57/02 | 451/36 |
| 6,203,705 B1 * | 3/2001 | James | B01D 61/1471 | 210/651 |
| 6,322,710 B1 * | 11/2001 | Katsumata | B04B 1/2016 | 210/103 |
| 6,375,012 B1 * | 4/2002 | Leyland | E02F 3/407 | 37/444 |
| 6,379,538 B1 * | 4/2002 | Corlett | C02F 1/006 | 210/418 |
| 6,402,599 B1 * | 6/2002 | Crevasse | B24B 57/02 | 451/60 |
| 6,447,674 B1 * | 9/2002 | Simon | G01G 13/024 | 222/64 |
| 6,482,325 B1 * | 11/2002 | Corlett | C02F 1/463 | 451/60 |
| 6,506,306 B1 * | 1/2003 | Hammer | C02F 1/444 | 210/651 |
| 6,508,387 B1 * | 1/2003 | Simon | B65D 90/587 | 137/554 |
| 6,547,961 B2 * | 4/2003 | Uto | B24B 57/02 | 210/194 |
| 6,656,359 B1 * | 12/2003 | Osuda | B24B 55/12 | 210/639 |
| 6,722,958 B2 * | 4/2004 | Matsumoto | B24B 37/04 | 451/60 |
| 6,733,225 B1 * | 5/2004 | Barnett | B66F 9/19 | 414/420 |
| 6,746,309 B2 * | 6/2004 | Tsuihiji | B01D 29/56 | 451/28 |
| 6,830,679 B2 * | 12/2004 | Tsuihiji | B01D 29/39 | 210/411 |
| 6,890,242 B2 * | 5/2005 | Tsuihiji | B01D 29/70 | 451/28 |
| 7,052,599 B2 * | 5/2006 | Osuda | B24B 37/04 | 451/60 |
| 7,186,390 B1 * | 3/2007 | Hellbusch | B01F 35/10 | 406/48 |
| 7,272,940 B2 * | 9/2007 | Vinberg | B63J 2/08 | 62/434 |
| 7,380,674 B2 * | 6/2008 | Vaine | E02F 3/404 | 37/444 |
| 7,381,323 B2 * | 6/2008 | Umezawa | B01D 29/114 | 210/791 |
| 7,718,511 B2 * | 5/2010 | Kajiyama | H01L 21/67132 | 257/E21.503 |
| 8,056,551 B2 * | 11/2011 | Dalitz | B28D 5/007 | 125/16.02 |
| 8,082,931 B2 * | 12/2011 | Turatti | A47J 43/24 | 15/3.13 |
| 8,112,913 B2 * | 2/2012 | Sirr | E02F 3/405 | 37/444 |
| 8,202,429 B2 * | 6/2012 | Abe | B01D 61/04 | 210/651 |
| 8,231,006 B2 * | 7/2012 | Grabbe | B08B 3/08 | 423/349 |
| 8,361,313 B2 * | 1/2013 | Pancaldi | B01D 29/72 | 210/167.04 |
| 8,505,733 B2 * | 8/2013 | Grabbe | B03D 1/02 | 423/349 |
| 8,528,740 B2 * | 9/2013 | Grabbe | B08B 3/08 | 209/10 |
| 8,529,845 B2 * | 9/2013 | Kois | B01F 35/451 | 422/261 |
| 8,940,174 B2 * | 1/2015 | Berndt | C10M 175/0058 | 210/182 |
| 9,186,606 B2 * | 11/2015 | Ishihara | B23Q 11/1069 | |
| 9,441,339 B2 * | 9/2016 | Kois | B01F 21/22 | |
| 9,592,471 B2 * | 3/2017 | Brummer | B01D 61/145 | |
| 9,611,623 B2 * | 4/2017 | Sager | E02F 3/407 | |
| 9,802,337 B2 * | 10/2017 | Nagai | B28D 5/007 | |
| 10,112,136 B2 * | 10/2018 | Morris | B23Q 11/0067 | |
| 10,266,789 B2 * | 4/2019 | Tanaka | B21C 9/00 | |
| 10,421,048 B2 * | 9/2019 | Hellbusch | B01F 21/30 | |
| 10,471,399 B1 * | 11/2019 | Hellbusch | B01F 35/71731 | |
| 10,478,787 B1 * | 11/2019 | Hellbusch | B01F 35/7179 | |
| 10,562,150 B2 * | 2/2020 | Yamanaka | H01L 21/304 | |
| 11,440,805 B2 * | 9/2022 | Chu | C01B 33/037 | |
| 11,897,084 B2 * | 2/2024 | Kordus | B24B 27/0084 | |
| 11,905,133 B1 * | 2/2024 | Prins | B01F 33/844 | |
| 12,123,268 B2 * | 10/2024 | Ross | E21B 21/065 | |
| 12,179,299 B2 * | 12/2024 | Strombach | B23Q 11/0003 | |
| 12,403,539 B2 * | 9/2025 | Zhao | B23D 59/02 | |
| 2002/0052064 A1 * | 5/2002 | Grabbe | B24B 37/042 | 257/E21.228 |
| 2002/0168926 A1 * | 11/2002 | Matsumoto | B01D 61/145 | 451/60 |
| 2003/0089647 A1 * | 5/2003 | Tsuihiji | B01D 29/39 | 210/97 |
| 2003/0189004 A1 * | 10/2003 | Chang | B24B 57/02 | 210/652 |
| 2004/0069878 A1 * | 4/2004 | Osuda | B24B 55/12 | 241/23 |

(56) References Cited

U.S. PATENT DOCUMENTS

| | | | | |
|---|---|---|---|---|
| 2004/0076497 A1* | 4/2004 | Barnett | ............ | B66F 9/19 414/424 |
| 2004/0262209 A1* | 12/2004 | Umezawa | ............ | B01D 29/66 210/216 |
| 2005/0279107 A1* | 12/2005 | Vinberg | ............ | B63B 25/26 62/434 |
| 2006/0266685 A1* | 11/2006 | Umezawa | ............ | B01D 37/02 210/216 |
| 2006/0266686 A1* | 11/2006 | Umezawa | ............ | B01D 37/02 210/216 |
| 2006/0266687 A1* | 11/2006 | Umezawa | ............ | B01D 63/089 210/791 |
| 2009/0191666 A1* | 7/2009 | Kumagai | ............ | H01L 21/78 438/109 |
| 2010/0163462 A1* | 7/2010 | Grabbe | ............ | B03D 1/02 209/3.1 |
| 2010/0163487 A1* | 7/2010 | Abe | ............ | B01D 61/04 210/652 |
| 2012/0024761 A1* | 2/2012 | Grabbe | ............ | B24B 27/06 209/208 |
| 2012/0027660 A1* | 2/2012 | Grabbe | ............ | B01D 61/18 209/208 |
| 2012/0261339 A1* | 10/2012 | Brummer | ............ | B01D 61/18 210/194 |
| 2014/0305857 A1* | 10/2014 | Brummer | ............ | B01D 61/22 210/195.2 |
| 2018/0050436 A1* | 2/2018 | Yamanaka | ............ | B24B 37/107 |
| 2021/0107799 A1* | 4/2021 | Chu | ............ | C01B 32/97 |
| 2023/0174382 A1* | 6/2023 | Chu | ............ | C01B 33/023 |
| 2023/0311221 A1* | 10/2023 | Zhao | ............ | B01D 21/0003 83/169 |
| 2024/0091681 A1* | 3/2024 | Yonezawa | ............ | B01D 29/92 |

FOREIGN PATENT DOCUMENTS

| | | |
|---|---|---|
| JP | 2009-096087 A | 5/2009 |
| JP | 2010-093004 A | 4/2010 |

* cited by examiner

Non-Porous Surface ←——→ Mesh-Like Surface

END MATERIAL RECOVERY APPARATUS

CROSS-REFERENCE TO RELATED APPLICATION

This application is based upon and claims the benefit of priority from Japanese Patent Application No. 2022-148127 filed on Sep. 16, 2022 in Japan, the entire contents of which are incorporated herein by reference.

FIELD

Embodiments described herein relate generally to an end material recovery apparatus.

BACKGROUND

In semiconductor manufacturing, for example, an end material of silicon (Si) is mixed into treated water at the time of back grinding. For this reason, after the treated water is stored in a treatment device of such a process, the device is periodically stopped, and the Si end material is separated from the treated water, it is necessary for a worker to manually remove the Si end material from the device.

Although not back grinding, for example, a waste liquid is caused to flow onto a punching metal by an end material recovery apparatus disposed inside a dicing device, and solid-liquid separation is performed by the punching metal to collect the end material. Then, the punching metal is pushed out to a position where the punching metal hangs down by its own weight, and the end material on the punching metal is dropped by the punching metal hanging down by its own weight. In addition, technology is disclosed in which a worker removes the end material dropped from the inside of the device while the dicing device is stopped.

The Si end material may have a sharp shape, and the worker may be injured manually. In addition, such work takes time, and during that time, the device should be stopped, and a production loss is large.

DETAILED DESCRIPTION

An end material recovery apparatus according to an embodiment includes a plurality of cages, a rotation drive mechanism, and a plurality of recovery containers. An upper portion in each of the plurality of cages is opened, the each of the plurality of cages has at least one surface formed of at least one of a mesh-like surface and a porous surface, and the plurality of cages are configured to receive a mixed liquid in which an end material is mixed with a liquid from the upper portion, collect at least a part of the end material in the mixed liquid, and discharge the liquid from the at least one surface. The rotation drive mechanism is configured to individually rotate the plurality of cages in a direction in which the upper portion faces downward. The plurality of recovery containers are configured to recover the end material dropped by individually rotating the plurality of cages in the direction in which the upper portion faces downward.

First Embodiment

Figure 1:
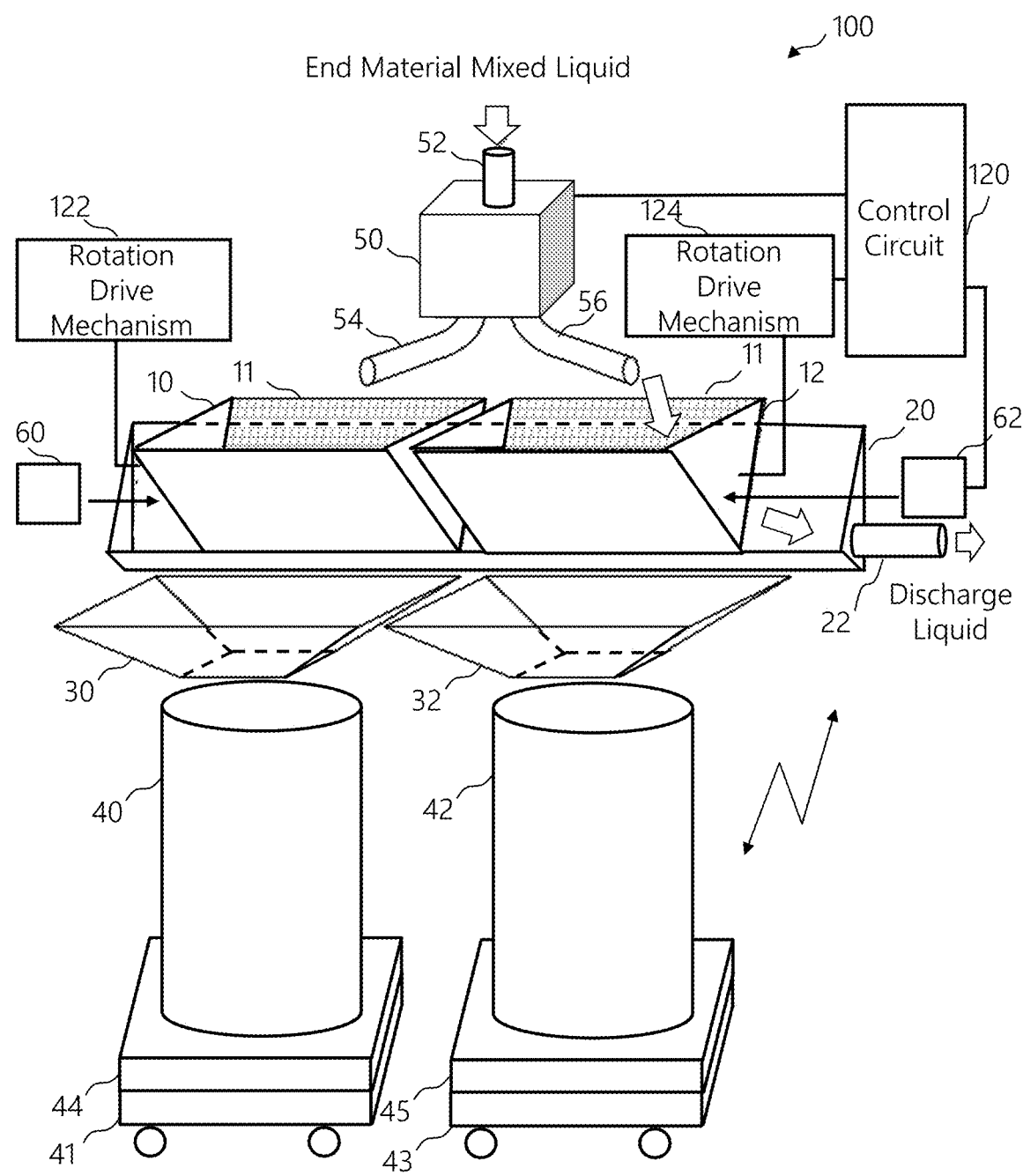
FIG. 1 is a diagram illustrating an example of a configuration of an end material recovery apparatus according to a first embodiment.

FIG. 1 is a diagram illustrating an example of a configuration of an end material recovery apparatus according to a first embodiment. In FIG. 1, an end material recovery apparatus 100 includes a plurality of cages 10 and 12, a drain receiver 20, a plurality of end material receivers 30 and 32, a plurality of recovery containers 40 and 42, a flow path switching mechanism 50, a plurality of sensors 60 and 62, one or more rotation drive mechanisms 122 and 124, and a control circuit 120.

The end material recovery apparatus 100 is controlled by the control circuit 120. The rotation drive mechanisms 122 and 124, the flow path switching mechanism 50, and the plurality of sensors 60 and 62 are connected to the control circuit 120 via a bus not illustrated partially in the drawings. Further, weight sensors 44 and 45 are connected to the control circuit 120 so as to be able to communicate in a wireless or wired manner, for example.

One or more rotation drive mechanisms 122 and 124 individually rotationally drive the plurality of cages 10 and 12. In the example of FIG. 1, a case where the plurality of rotation drive mechanisms 122 and 124 individually rotationally drive the plurality of cages 10 and 12 is illustrated. In the example of FIG. 1, a case where two rotation drive mechanisms 122 and 124 of the same number as the number of cages 10 and 12 are disposed is illustrated, but the plurality of cages 10 and 12 may be individually rotationally driven by one rotation drive mechanism.

The end material recovery apparatus 100 is disposed on the downstream side of a process apparatus (treatment device) (not illustrated in the drawings) that discharges a mixed liquid mixed with an end material (or "broken piece" or "debris") of silicon (Si), for example. Examples of the process apparatus include a back grinding apparatus, a polishing apparatus, and a dicing apparatus.

A supply port 52 is disposed on the water supply side of the flow path switching mechanism 50. Two drain ports 54 and 56 are disposed on the drain side of the flow path switching mechanism 50. As the flow path switching mechanism 50, for example, a three-way valve can be used. The drain port 54 is disposed above the cage 10. The drain port 56 is disposed above the cage 12. The flow path switching mechanism 50 switches the flow path so that the mixed liquid selectively flows to any one of the plurality of cages 10 and 12. Specifically, the flow path switching mechanism 50 selectively switches the flow path of the mixed liquid supplied from the supply port 52 to one of the two drain ports 54 and 56. As a result, when the drain port 54 serves as the flow path, the mixed liquid flows to the cage 10 in the plurality of cages 10 and 12. When the drain port 56 serves as the flow path, the mixed liquid flows to the cage 12 in the plurality of cages 10 and 12.

The drain receiver 20 is disposed below the plurality of cages 10 and 12. Further, the plurality of end material receivers 30 and 32 are disposed below opened surfaces when the plurality of cages 10 and 12 rotate. In the example of FIG. 1, the end material receiver 30 is disposed below the cage 10. The end material receiver 32 is disposed below the cage 12. In FIG. 1, the configurations of the parts of the end material receivers 30 and 32 located below the plurality of cages 10 and 12 are mainly illustrated, but the configurations of the other parts of the end material receivers 30 and 32 will be described later.

A plurality of recovery containers 40 and 42 are disposed below the plurality of end material receivers 30 and 32. In other words, the plurality of end material receivers 30 and 32 are disposed between the plurality of cages 10 and 12 and the plurality of recovery containers 40 and 42. In the example of FIG. 1, the recovery container 40 is disposed below the end material receiver 30. The recovery container 42 is disposed below the end material receiver 32. The recovery container 40 is disposed on a carriage 41. The recovery container 42 is disposed on a carriage 43. The weight sensor 44 is disposed on the carriage 41 to measure a weight of the recovery container 40. The weight sensor 45 is disposed on the carriage 43 to measure a weight of the recovery container 42.

The plurality of cages 10 and 12 have an opened upper portion and has at least one surface formed of at least one of a mesh-like surface and a porous surface. The plurality of cages 10 and 12 receive the mixed liquid in which the end material is mixed with the liquid from the upper portion, collects at least a part of the end material in the mixed liquid, and discharges the liquid from at least one surface. The cages 10 and 12 are preferably formed of, for example, a material such as stainless steel.

Figure 2:
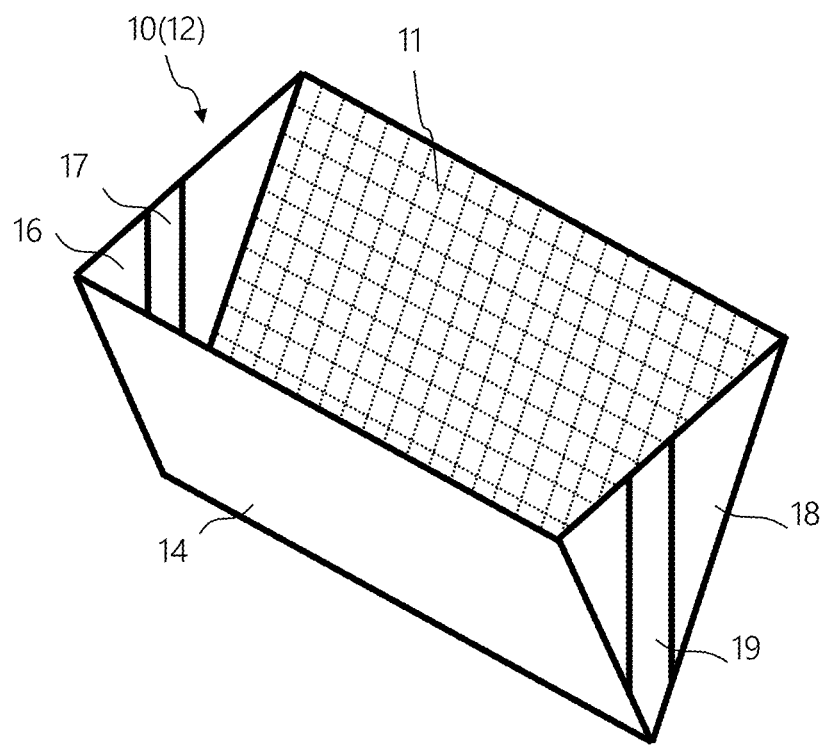
FIG. 2 is a perspective view illustrating an example of a cage according to the first embodiment.

FIG. 2 is a perspective view illustrating an example of a cage in the first embodiment. In the example of FIG. 2, a case where the cage 10 (12) is formed to have a V-shaped cross section is illustrated. The cage 10 (12) has a shape in which a surface 11 (first surface) and a surface 14 (second surface) have bottom sides connected in a V shape at a non-horizontal angle, and are disposed in a substantially mirror-image target. In other words, the surface 11 and the surface 14 are connected to each other at a non-horizontal angle on one side of the outer circumferences thereof. In the example of FIG. 2, a case where the bottom sides are connected at an acute angle is illustrated. In addition, a surface 16 (third surface) and a surface 18 (fourth surface) formed in a triangle block a surface between the sides on each side surface side continuous to the connected side (bottom side) of the surface 11 and the surface 14.

One surface 11 of the surface 11 and the surface 14 is formed of at least one of a mesh-like surface and a porous surface. The mesh-like surface is formed by, for example, knitting a plurality of steel wires such as stainless steel in a spiral shape or a lattice shape such that a gap is formed between the steel wires. The porous surface on which many holes are formed is formed by, for example, performing punching metal processing on a plate material at a predetermined pitch. As a result, a large number of gaps (holes and openings) are two-dimensionally arranged on the surface 11 at a predetermined pitch. The size of the gap can be appropriately set according to a size of an object to be collected. For example, the gap size is preferably set to about 1 to 3 mm. Therefore, the surface 11 collects (separates) and retains at least a part of the end material from the mixed liquid, and discharges the liquid from the gap.

The other surface 14 of the surface 11 and the surface 14 is formed of a plate-like surface without a gap. Therefore, the surface 14 does not allow the liquid to pass therethrough.

Transparent surfaces 17 and 19 are disposed on at least one of the surfaces 16 and 18 on the side surface side. For example, the transparent surfaces 17 and 19 extend in a band shape from bottom portions of the cages 10 and 12 toward upper opening surfaces. As a result, it is possible to detect the amount of the end material accumulated inside the cages 10 and 12 from the outside of the side surfaces of the cages 10 and 12. For the transparent surfaces 17 and 19, for example, a light transmitting material such as glass or polyvinyl chloride resin is preferably used.

Figure 3:
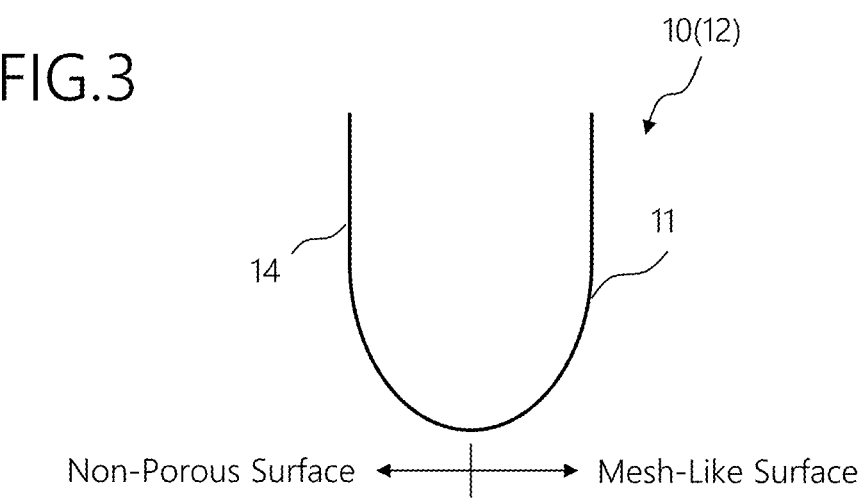
FIG. 3 is a cross-sectional view illustrating another example of the cage according to the first embodiment.

FIG. 3 is a cross-sectional view illustrating another example of the cage in the first embodiment. In the example of FIG. 3, a case where the cage 10 (12) is formed in a U-shaped cross section is illustrated. The cage 10 (12) has a shape in which a U-shaped right-half surface 11 (first surface) and a U-shaped left-half surface 14 (second surface) are connected at the bottom portions at a non-horizontal angle, and are disposed in a substantially mirror-image target. In addition, a surface 16 (third surface) and a surface 18 (fourth surface) not illustrated in the drawings block surfaces between U-shaped outlines on the side surface sides of the surface 11 and the surface 14 connected so as to form a U-shaped cross section. The surface 11 is formed of at least one of a mesh-like surface and a porous surface. Therefore, the surface 11 collects (separates) and retains at least a part of the end material from the mixed liquid, and discharges the liquid from the gap. The surface 14 is formed of a plate-like surface in which no gap (hole) is formed. Therefore, the surface 14 does not allow the liquid to pass therethrough.

Figure 4:
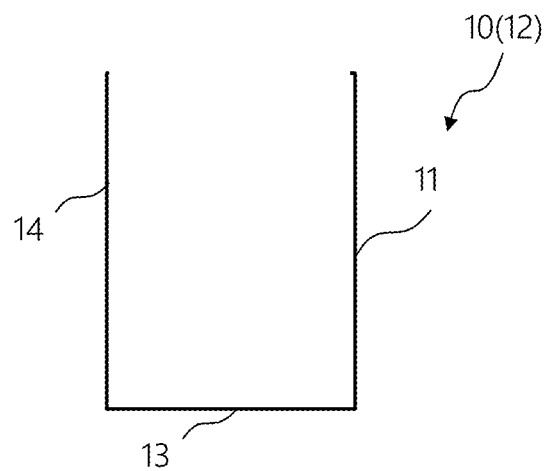
FIG. 4 is a cross-sectional view illustrating another example of the cage according to the first embodiment.

FIG. 4 is a cross-sectional view illustrating another example of the cage in the first embodiment. In the example of FIG. 4, a case where a cross-sectional shape of the cage 10 (12) is formed by a bottom side, one side connected to one of both ends of the bottom side, and one side connected to the other is illustrated. In other words, the surface 11 and the surface 14, which are disposed in the substantially mirror-image target at a non-horizontal angle, are indirectly connected at the bottom portion via the bottom surface 13. In addition, in the example of FIG. 4, the cage 10 (12) is formed by the two parallel surfaces 11 and 14, the bottom surface 13 of a plane connecting the surfaces 11 and 14, and the rectangular surfaces 16 and 18 (not illustrated in the drawings) disposed on the sides of the surfaces 11, 14, and 13. The surface 11 is formed of at least one of a mesh-like surface and a porous surface. Therefore, the surface 11 collects (separates) and retains at least a part of the end material from the mixed liquid, and discharges the liquid from the gap. The surface 14 and the surface 13 are formed of plate-like surfaces in which no gap is formed. Therefore, the surface 14 and the surface 13 do not allow the liquid to pass therethrough.

The rotation drive mechanisms 122 and 124 individually rotate the plurality of cages 10 and 12 in a direction in which the upper portion faces downward. Specifically, the rotation drive mechanism 122 rotationally drives the cage 10 in a direction in which a vertical direction is inverted. The rotation drive mechanism 124 rotationally drives the cage 12 in a direction in which the vertical direction is inverted. In the example of FIG. 1, a case where one rotation drive mechanism 122 and one rotation drive mechanism 124 are respectively disposed for the cages 10 and 12 is illustrated, but the present disclosure is not limited thereto. As described above, the plurality of cages 10 and 12 may be individually rotated by one rotation drive mechanism.

The rotation drive mechanisms 122 and 124 have, for example, a motor not illustrated in the drawings, a rotation shaft that rotates by rotation of the motor, a bearing that supports the rotation shaft, and the like. For example, the rotation shaft is connected to the surface 16 or the surface 18 which is a side surface of the cage 10 (12), and the rotation shaft rotates to rotate the cage 10 (12) around a connection point as an axis. The rotation drive mechanisms 122 and 124 may include other components.

Figure 5A:
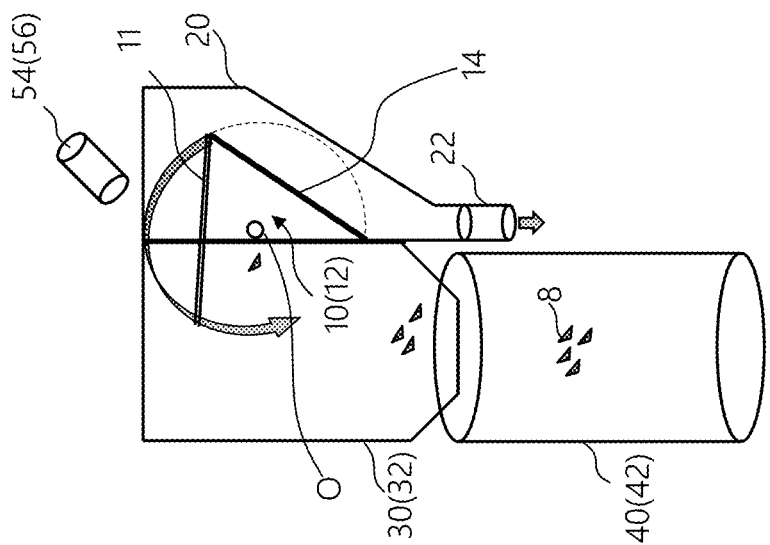
FIGS. 5A to 5C are diagrams illustrating an operation from the separation to the recovery of an end material according to the first embodiment.
Figure 5B:
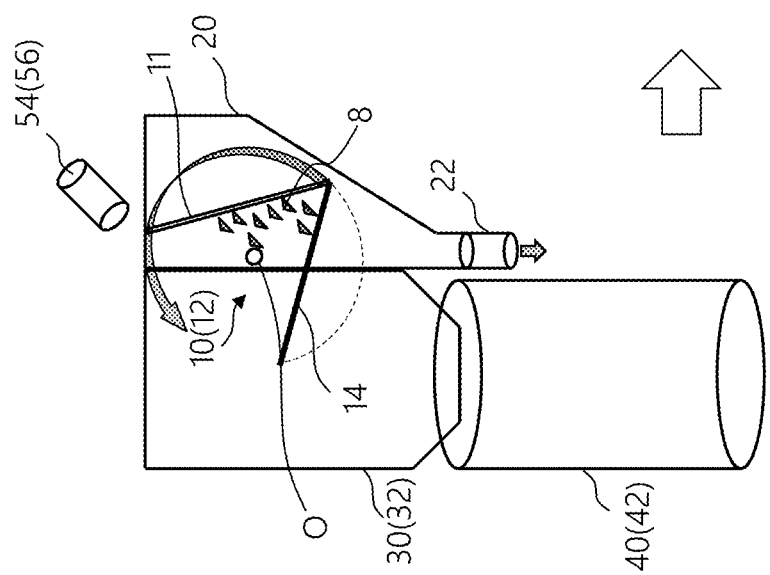
Figure 5C:
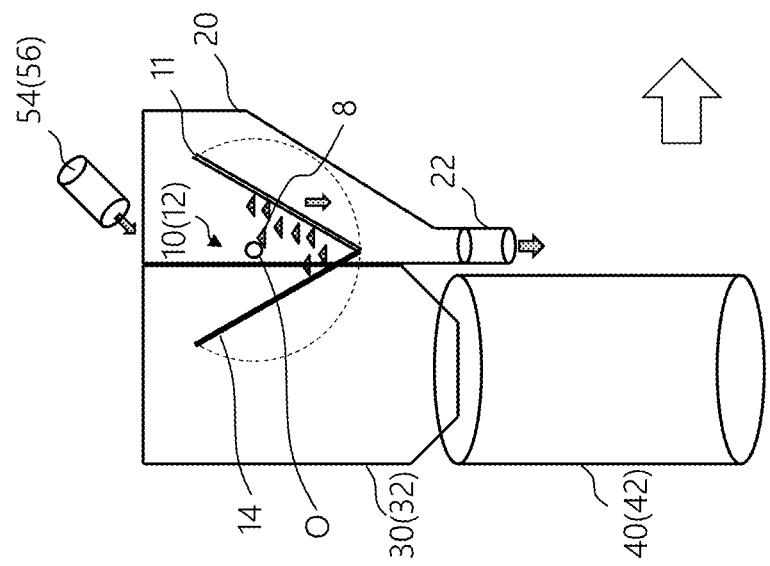

FIGS. 5A to 5C are diagrams illustrating an operation from the separation to the recovery of an end material in the first embodiment. In FIG. 5A, the mixed liquid discharged from the drain port 54 (or the drain port 56) of the flow path switching mechanism 50 is supplied to the cage 10 (or the cage 12) from above. The cage 10 (or the cage 12) separates the end material 8 from the mixed liquid at the surface 11 to be a mesh-like surface (porous surface), and discharges the remaining liquid to the side of the drain receiver 20. As a result, solid-liquid separation of the mixed liquid can be performed. The liquid having passed through the surface 11 is discharged from the drain port 22 of the drain receiver 20 to the outside of the end material recovery apparatus 100. In addition, the surface 14 that is not a mesh-like surface facing the surface 11 and the side surfaces 16 and 18 can prevent the liquid from entering the side of the end material receiver 30 (or the end material receiver 32).

Figure 6:
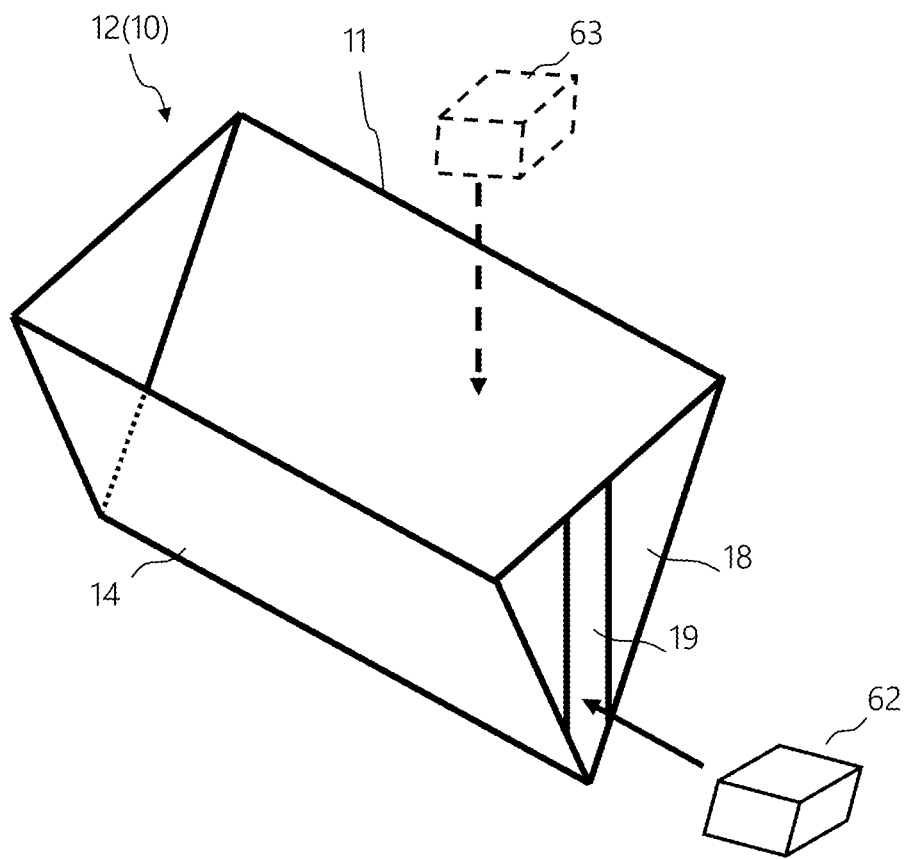
FIG. 6 is a diagram illustrating a method of measuring an amount of the end material accumulated in the cage according to the first embodiment.

FIG. 6 is a diagram illustrating a method of measuring an amount of the end material accumulated in the cage in the first embodiment. The plurality of sensors 60 and 62 detect the end material 8 accumulated in each of the plurality of cages 10 and 12. In the example of FIG. 6, a case where the end material 8 accumulated in the cage 12 is detected is illustrated. A prescribed amount of the end material 8 accumulated in the cage 12 is detected by the sensor 62 through the vertically long transparent surface 19 provided on the side surface of the cage 12. In the case of the cage 10, the end material 8 accumulated in the cage 10 is detected by the sensor 60 through the vertically long transparent surface portion 17 provided on the side surface of the cage 10. As the sensors 60 and 62, for example, a distance sensor that emits a laser and receives reflected light can be used. In a case where the end material 8 is deposited, a distance to a target object hit by the laser becomes shorter as compared with a case where the end material 8 is not deposited, so that the deposition of the end material 8 can be detected.

The arrangement height positions of the sensors 60 and 62 are preferably set such that the upper height positions of all of the plurality of end materials 8 are irradiated with a laser beam in a state where a prescribed amount of end materials 8 are accumulated in the cages 10 and 12. As a result, the sensors 60 and 62 can detect the end materials 8 when the end materials 8 are accumulated up to the heights.

When it is difficult to detect the end material 8 by transmission of detection light from the surface portions 17 and 19 of the side surfaces of the cages 10 and 12, sensors 63 may be installed on the upper portions of the cages 10 and 12, respectively, instead of the sensor 60 (62), and may perform detection. In this case, the plurality of sensors 63 detect the end material 8 accumulated in the cage 10 (12) from above the corresponding cage 10 (12) in the plurality of cages 10 and 12.

Here, the height position detected by the sensors 60 and 62 is set to a position corresponding to the height of the upper portion of the end material 8 at a stage when the prescribed amount of the end material 8 is accumulated, assuming that a time until the prescribed amount of the end material 8 is accumulated in the cages 10 and 12 is longer than a time until the accumulated end material 8 is dried. For example, in a case where the end material 8 accumulated to a height of ½ in the cage 10 can be dried in one day and it takes one week to accumulate the end material 8 to a height of ½ in the cage 12, the end material 8 accumulated in the cage 10 can be dried in time during the collection of the end material 8 on the side of the cage 12, so that the prescribed amount is set to the height of ½ of the cage 10.

At a stage when the prescribed amount of the end material 8 is accumulated in the cage 10 (or the cage 12), the flow path switching mechanism 50 switches the cage 10 (or the cage 12) that receives the mixed liquid. For example, by switching the flow path of the mixed liquid from the drain port 54 to the drain port 56, the receiving side of the mixed liquid is switched from the cage 10 to the cage 12. In other words, at a stage when a prescribed amount of the end material 8 is accumulated in one cage (for example, the cage 10) in which the flow path is formed in the plurality of cages 10 and 12, the flow path switching mechanism 50 switches the flow path from one cage (for example, the cage 10) to the other cage (for example, the cage 12). At this time, the cage 12 separates the end material 8 from the mixed liquid at the surface 11 to be the mesh-like surface, and discharges the remaining liquid to the side of the drain receiver 20. As a result, solid-liquid separation of the mixed liquid can be performed. The liquid having passed through the surface 11 is discharged from the drain port 22 of the drain receiver 20 to the outside of the end material recovery apparatus 100.

Then, at a stage when the prescribed amount of the end material 8 is accumulated in the cage 12, the flow path switching mechanism 50 switches the flow path of the mixed liquid from the drain port 56 to the drain port 54, so that the receiving side of the mixed liquid is switched from the cage 12 to the cage 10. Thereafter, switching between the cages 10 and 12 is similarly repeated.

By such a switching operation, the end material recovery apparatus 100 can continuously receive the mixed liquid without stopping a process device on the upstream side, and separate the end material 8 from the mixed liquid, and recover the end material 8.

The control circuit 120 receives a signal indicating that the prescribed amount is reached from the sensors 60 and 62, and starts measurement for a predetermined period until the cages 10 and 12 are rotated to recover the accumulated end material 8 when the cages 10 and 12 that receive the mixed liquid are switched. As the predetermined period from when the cages 10 and 12 are switched to when the rotation of the cages 10 and 12 is started, it is preferable to use a period shorter than a period until the prescribed amount of the end material 8 detected by the sensor 62 is accumulated in the switched new cage 12, for example, a time until the end material 8 accumulated in the cage 10 is dried. Before the end material 8 is dried, the accumulated end material 8 may not be removed while being stuck on the surface 11 or the like of the cage 10. By drying, the end material 8 can be easily removed from the surface 11 or the like of the cage 10. For drying the end material 8, a warm air injection device (not illustrated in the drawings) that injects warm air toward the end material 8 in the cage 10 during the above-described predetermined period of waiting for rotation may be preferably disposed.

At a stage when a predetermined period elapses after the cages 10 and 12 are switched, the cage 10 (or the cage 12) is rotated as illustrated in FIG. 5B. In FIG. 5B, for example, a state of rotation by about 60° is illustrated. In such a state, the surface 11 of the mesh-like surface is beyond a vertical position, but the surface 14 that is not the mesh-like surface is on the near side from a horizontal position with respect to a rotation direction, so that the collected end material 8 is not dropped.

As illustrated in FIG. 5C, the cage 10 (or the cage 12) is further rotated. In FIG. 5C, for example, a state of rotation by about 120° is illustrated. In such a state, the surface 11 of the mesh-like surface is close to the horizontal position, and the surface 14 that is not the mesh-like surface faces downward beyond the horizontal position, so that the collected end material 8 is removed and dropped from the surface 11 of the mesh-like surface or slides down from the surface 14 not to be the mesh-like surface toward the end material receiver 30 (or the end material receiver 32) disposed on the opposite side of the drain receiver 20. As illustrated in FIG. 5C, a rotation angle may be set to a position where the opened-side end of the surface 14 that is not the mesh-like surface faces downward and does not enter the inside of the drain receiver 20. As a result, it is possible to prevent the end material 8 from being dropped into the drain receiver 20.

The end material 8 that has been removed and dropped or has slid down further passes through a passage of the end material receiver 30 (or the end material receiver 32) and is dropped from the end material receiver 30 (or the end material receiver 32). The recovery container 40 (or the recovery container 42) is disposed below the end material receiver 30 (or the end material receiver 32). The plurality of end material receivers 30 and 32 guide the end material 8 dropped from the plurality of cages 10 and 12 to the plurality of recovery containers 40 and 42. Specifically, the end material 8 dropped from one (for example, the cage 10) of the plurality of cages 10 and 12 is guided to one (for example, the recovery container 40) of the plurality of recovery containers 40 and 42, and the end material 8 dropped from the other (for example, the cage 12) of the plurality of cages 10 and 12 is guided to the other (for example, the recovery container 42) of the plurality of recovery containers 40 and 42.

The plurality of recovery containers 40 and 42 recover the end material 8 dropped by individually rotating the plurality of cages 10 and 12 in a direction in which the upper portion faces downward. In the example of FIG. 5C, the recovery container 40 recovers the end material 8 dropped from the end material receiver 30. The recovery container 42 recovers the end material 8 dropped from the end material receiver 32.

At a stage when the weight measured by the weight sensor 44 reaches the prescribed amount by the end material 8 being accumulated in the recovery container 40, while the recovery container 42 is recovering the end material 8, a worker moves the recovery container 40 and replaces the recovery container with another recovery container. For example, the control circuit 120 turns on a lamp in a case of receiving a signal indicating that the weight has reached the prescribed amount from the weight sensor 44. When the lamp is turned on, the worker moves the recovery container 40. The end material 8 accumulated in the recovery container 40 is discarded after the movement. Alternatively, while the recovery container 42 is collecting the end material 8, the worker moves the recovery container 40, and moves the recovery container 40 to the original position after discarding the end material 8 inside. As a result, the new recovery container 40 becomes empty. By using the carriage 41, the worker can easily move the recovery container 40 and replace the moved recovery container 40. Therefore, workability can be improved.

Then, at a stage when the weight measured by the weight sensor 45 reaches the prescribed amount by the end material 8 being accumulated in the recovery container 42, while the recovery container 40 is recovering the end material 8, the worker moves the recovery container 42 and replaces the recovery container with another recovery container. For example, the control circuit 120 turns on a lamp in a case of receiving a signal indicating that the weight has reached the prescribed amount from the weight sensor 45. When the lamp is turned on, the worker moves the recovery container 42. The end material 8 accumulated in the recovery container 42 is discarded after the movement. Alternatively, while the recovery container 40 is recovering the end material 8, the worker moves the recovery container 42, and moves the recovery container 42 to the original position after discarding the end material 8 inside. As a result, the new recovery container 42 becomes empty. By using the carriage 43, the worker can easily move the recovery container 42 and replace the moved recovery container 42. Therefore, workability can be improved.

By repeating such an operation, the recovery of the end material 8 can be continuously performed. Therefore, it is not necessary to stop a process device on the upstream side, and productivity can be improved. Further, since the separation and recovery of the end material 8 are automatically performed in the end material recovery apparatus 100, it is possible to prevent the worker from directly touching the end material 8. Therefore, safety can be improved as compared with the related art.

Figure 7:
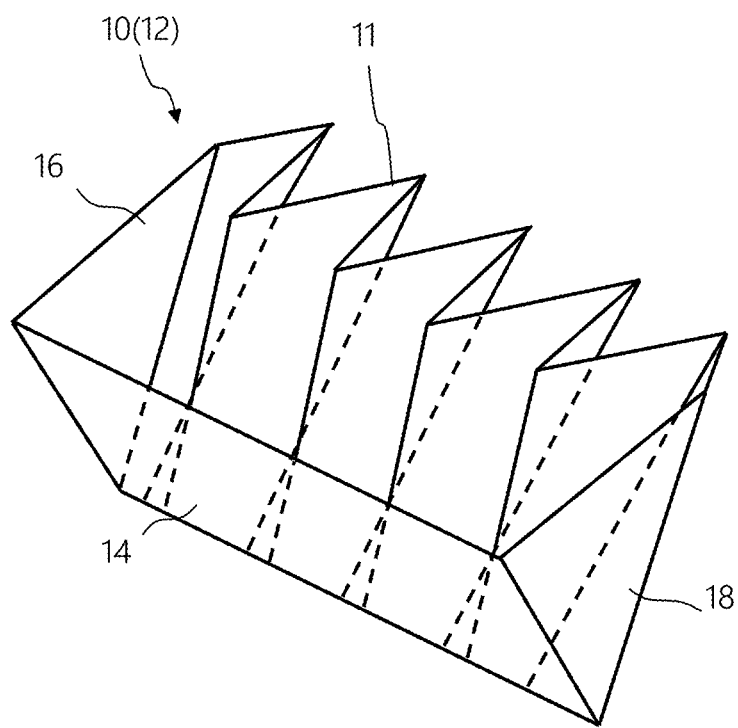
FIG. 7 is a diagram illustrating another example of a configuration of the cage according to the first embodiment.

FIG. 7 is a diagram illustrating another example of a configuration of the cage in the first embodiment. In the example of FIG. 7, the surface 11 to be a mesh-like surface (porous surface) is not one plane disposed mirror-symmetrically with respect to the surface 14 that is not a mesh-like surface (porous surface), but is formed by, for example, coupling the surfaces 11 to be a plurality of mesh-like surfaces (porous surfaces) in a zigzag manner. The other points are similar to those in FIG. 2. In such a case, an area of a surface portion that collects the end material 8 can be increased as compared with the case of a flat surface. By increasing the area of the portion to be the mesh-like surface (porous surface), the liquid can be easily flown. As a result, it is possible to increase a processing amount per unit time of the mixed liquid flowing into the cage 10 (12).

Figure 8:
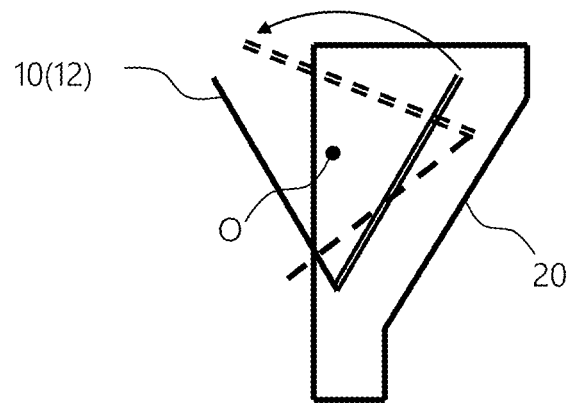
FIG. 8 is a diagram illustrating an example of a rotation operation of the cage according to the first embodiment.

FIG. 8 is a diagram illustrating an example of a rotation operation of the cage in the first embodiment. In the example of FIG. 8, a case where a rotation axis O is set to a center position or a center of gravity position of the side surface of the cage 10 (12) is illustrated. However, the present disclosure is not limited thereto.

Figure 9:
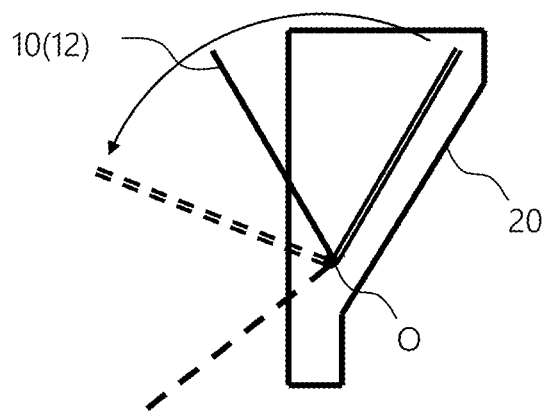
FIG. 9 is a diagram illustrating another example of the rotation operation of the cage according to the first embodiment.

FIG. 9 is a diagram illustrating another example of the rotation operation of the cage in the first embodiment. As illustrated in FIG. 9, a bottom side position of the cage 10 (12) may suitably be set to the rotation axis O.

Figure 10:
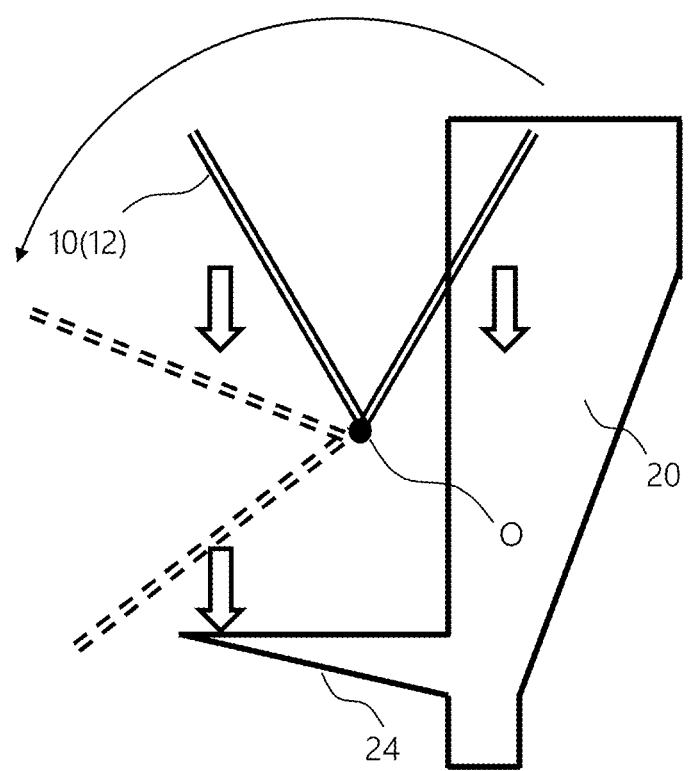
FIG. 10 is a diagram illustrating another example of the configuration of the cage according to the first embodiment.

FIG. 10 is a diagram illustrating another example of the configuration of the cage in the first embodiment. In the example of FIG. 10, a case where four surfaces constituting the cage 10 (12) have a mesh (porous) structure is illustrated. In a case where the amount of the mixed liquid flowing into the cage 10 (12) may exceed an allowable discharge amount of one mesh-like surface (porous surface), it is possible to increase an area where the mixed liquid can pass to the drain receiver 20 by forming the four surfaces into the mesh (porous) structure. When the four surfaces have the mesh (porous) structure, the mixed liquid passes through not only the surface 11 but also the surfaces 14, 16, and 18, so that the liquid is discharged from the cages 10 and 12 to the drain receiver 20 in a wide range. In such a case, a receiving port 24 of the drain receiver 20 may be extended and widened toward the end material receiver 30 (32), and conversely, the position of the end material receiver 30 (32) may be shifted. In addition, in a case where the receiving port 24 is extended with the four surfaces having the mesh (porous) structure, if the center of the side surfaces of the cages 10 and 12 is used as a rotation axis, the receiving port 24 may be widened to a dropping position of the end material 8. Therefore, in such a case, a configuration in which the bottom side position of the cages 10 and 12 is used as the rotation axis is more desirable than a configuration in which the center of the side surfaces of the cages 10 and 12 is used as the rotation axis.

Figure 11:
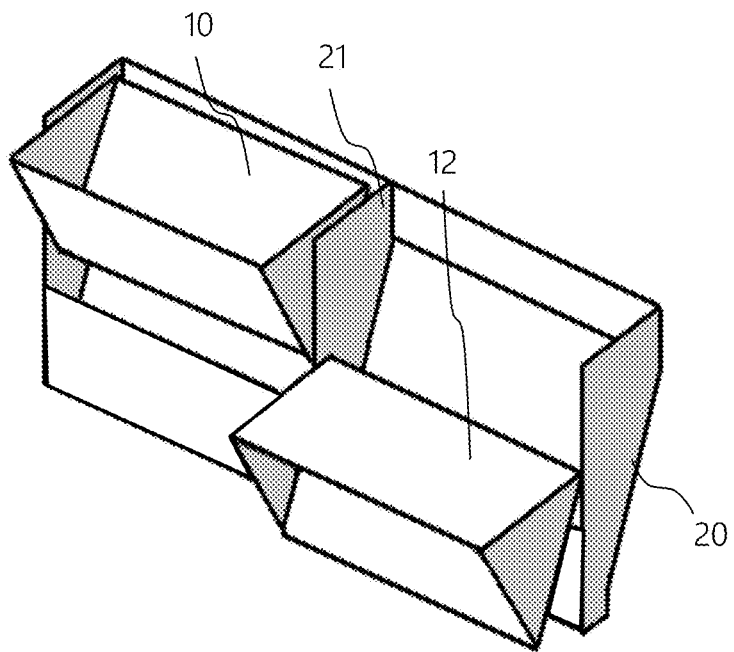
FIG. 11 is a diagram illustrating a case where a plurality of cages are disposed without a space therebetween according to the first embodiment.

FIG. 11 is a diagram illustrating a case where a plurality of cages are disposed without a space therebetween in the first embodiment.

Figure 12:
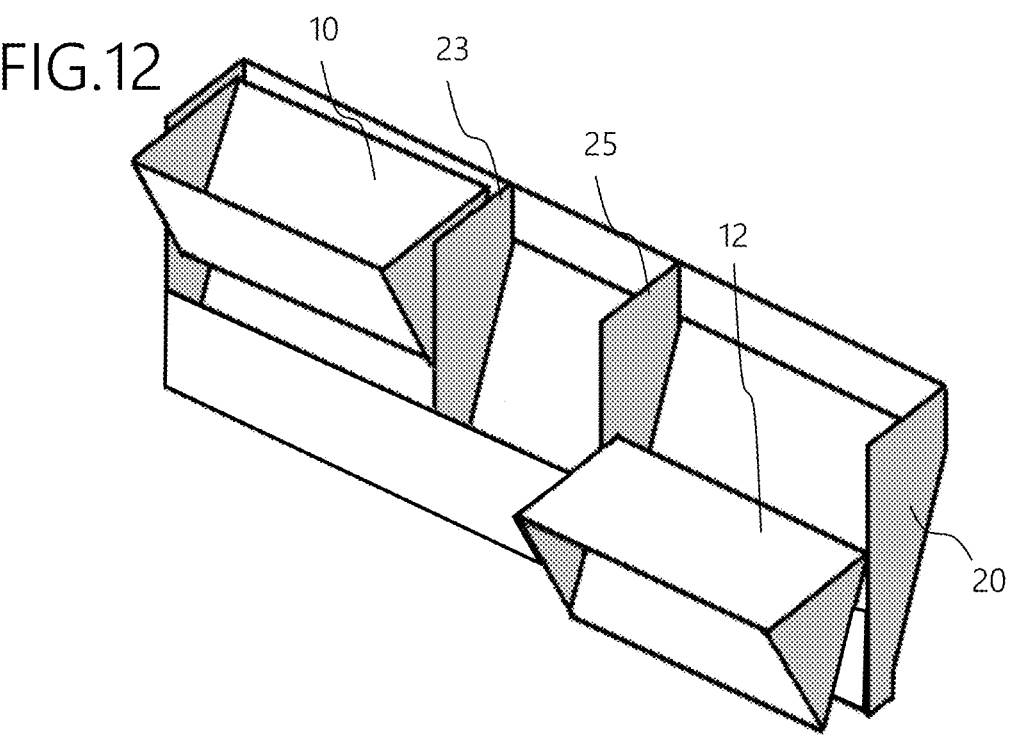
FIG. 12 is a diagram illustrating a case where a plurality of cages are disposed with a space therebetween according to the first embodiment.

FIG. 12 is a diagram illustrating a case where a plurality of cages are disposed with a space therebetween in the first embodiment.

As illustrated in FIG. 11, the plurality of cages 10 and 12 may be disposed with substantially no extra space between the plurality of cages 10 and 12, or as illustrated in FIG. 12, the plurality of cages 10 and 12 may be disposed with a large space therebetween. In the configuration illustrated in FIG. 11, a partition plate 21 is disposed between the plurality of cages 10 and 12. In the configuration illustrated in FIG. 12, a partition plate 23 is disposed between the cage 10 and the space, and a partition plate 25 is disposed between the space and the cage 12. By the partition plates 21, 23, and 25, it is possible to partition the plurality of cages 10 and 12 such that the liquid of the mixed liquid received in one of the cages 10 and 12 does not enter the other of the cages 10 and 12 during drying of the end material 8, for example.

Figure 13:
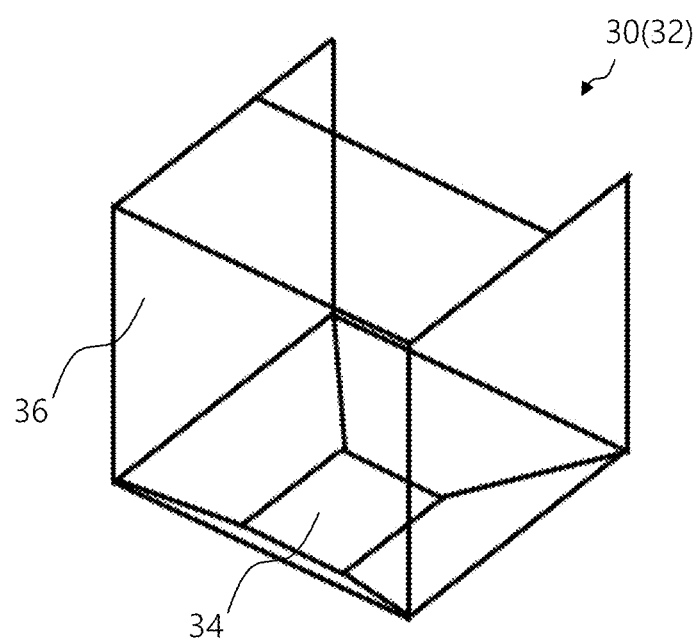
FIG. 13 is a diagram illustrating an example of a configuration of an end material receiver according to the first embodiment.

FIG. 13 is a diagram illustrating an example of a configuration of an end material receiver in the first embodiment.

Figure 14:
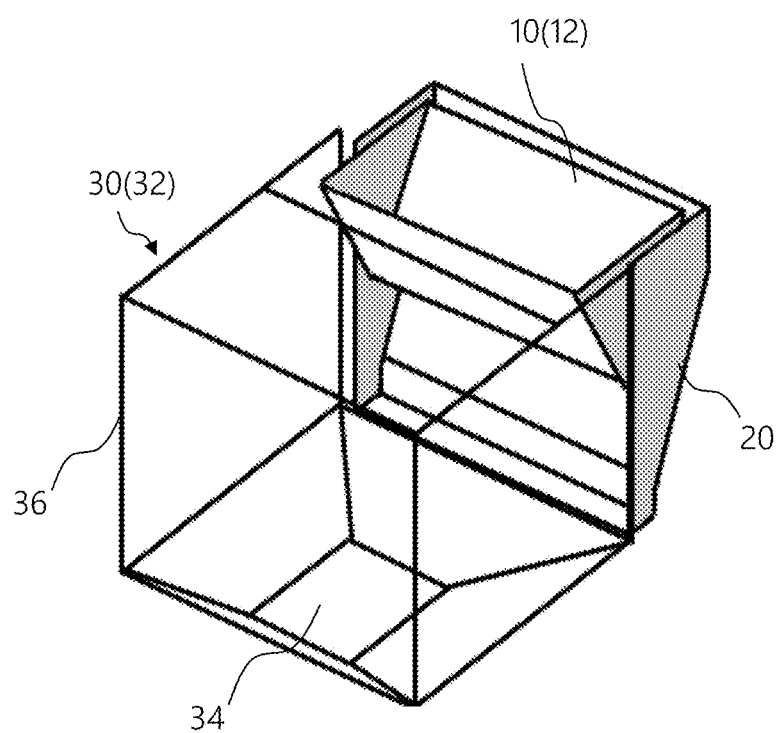
FIG. 14 is a diagram illustrating an example of a state in which an end material receiver, a cage, and a drain receiver are disposed according to the first embodiment.

FIG. 14 is a diagram illustrating an example of a state in which an end material receiver, a cage, and a drain receiver are disposed in the first embodiment. In FIGS. 13 and 14, a shape of the inside of the end material receiver 30 (32) is illustrated to be seen through. A passage 34 is formed in the end material receiver 30 (32) so that the end material 8 gathers on the recovery container 40 (42) with a limited movement range. As illustrated in FIGS. 13 and 14, the passage 34 of the end material receiver 30 (32) is covered with the cover 36 so that the end material 8 does not leak to the outside when the cage 10 (12) rotates. As a result, when the dried end material 8 is dropped from the cage 10 (12) into the recovery container 40 (42) installed in the lower portion, the end material 8 can be prevented from scattering around. As illustrated in FIG. 14, the end material receiver 30 and the drain receiver 20 are preferably disposed around the rotating cages 10 and 12 in a positional relation in which the waste water and the end material 8 do not leak to the outside.

As described above, according to the first embodiment, the treated water mixed with the Si end material can be discharged from the treatment device, and the Si end material in the waste water from the treatment device can be recovered without stopping the treatment device.

In addition, according to the first embodiment, the number of drive units is no more than that of the flow path switching mechanism and the reciprocating rotation structure of the recovery cage, and the life of the end material recovery apparatus can be increased.

In addition, since the end material does not come into direct contact with the variable drive unit, a high operation rate can be achieved with a structure in which a trouble such as biting does not occur.

The embodiments have been described above with reference to the specific examples. However, the present disclosure is not limited to these specific examples.

In addition, all end material recovery apparatuses that include the elements of the present disclosure and can be appropriately changed in design by those skilled in the art are included in the scope of the present disclosure.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

What is claimed is:

1. In a semiconductor manufacturing system, an end material recovery apparatus comprising:
a plurality of cages each having an open upper portion, the plurality of cages each having at least one surface formed of at least one of:
a mesh surface; and
a porous surface;
the plurality of cages being configured to receive a mixed liquid in which an end material is mixed with a liquid from the open upper portion, collect at least a part of the end material in the mixed liquid, and discharge the liquid through the at least one surface;
a rotation drive mechanism configured to individually rotate the plurality of cages in a direction in which the open upper portion faces downward; and
a plurality of recovery containers configured to recover the end material dropped by individually rotating the plurality of cages in the direction in which the open upper portion faces downward.

2. The apparatus according to claim 1, wherein the plurality of cages each have one of:
a V-shaped cross section;
a U-shaped cross section; and
a shape formed by a bottom side, a first side connected to one of both ends of the bottom side, and a second side connected to the other of the both ends of the bottom side.

3. The apparatus according to claim 1, wherein the plurality of cages each include first and second surfaces in which one side of an outer circumference of the first surface and one side of an outer circumference of the second surface are connected at a non-horizontal angle, and at least one of the first and second surfaces is formed of at least one of the mesh surface and the porous surface.

4. The apparatus according to claim 3, wherein one of the first and second surfaces is formed of at least one of the mesh surface and the porous surface and discharges the liquid, and the other of the first and second surfaces does not allow the liquid to pass therethrough.

5. The apparatus according to claim 3, wherein the plurality of cages further include third and fourth surfaces that block surfaces between sides on respective side surface sides continuous to the connected sides of the first and second surfaces, and the first, second, third, and fourth surfaces are formed of at least one of the mesh surface and the porous surface, and discharge the liquid therethrough.

6. The apparatus according to claim 1, wherein a part of a cage of the plurality of cages has a shape in which a plurality of surfaces of at least one of the mesh surface and the porous surface are coupled in a zigzag manner.

7. The apparatus according to claim 1, further comprising a plurality of sensors configured to detect the amount of end material accumulated in the plurality of cages.

8. The apparatus according to claim 7, wherein each of the plurality of sensors detects the end material accumulated in a corresponding cage of the plurality of cages from a side surface of the corresponding cage.

9. The apparatus according to claim 8, wherein each of the plurality of cages includes a side surface having a surface portion formed of a light transmitting material.

10. The apparatus according to claim 7, wherein each of the plurality of sensors is positioned such that the sensor detects the end material accumulated in a corresponding cage of the plurality of cages from above the corresponding cage.

11. The apparatus according to claim 1, further comprising a switching mechanism configured to switch a flow path so as to cause the mixed liquid to selectively flow to any one of the plurality of cages.

12. The apparatus according to claim 11, wherein at a stage where a predetermined amount of the end material is accumulated in one cage in which the flow path is formed in the plurality of cages, the switching mechanism switches the flow path from the one cage to the other cage.

13. The apparatus according to claim 12, wherein after passage of a predetermined time period, the switching mechanism switches the flow path from the one cage to another cage and the rotation drive mechanism rotates the one cage.

14. The apparatus according to claim 1, further comprising a plurality of end material receivers disposed between the plurality of cages and the plurality of recovery containers, each end material receiver being configured to guide the end material dropped from one of the plurality of cages to one of the plurality of recovery containers and guide the end material dropped from another of the plurality of cages to another of the plurality of recovery containers.

15. The apparatus according to claim 14, wherein passages are formed in the plurality of end material receivers such that the end material accumulates in a corresponding recovery container of the plurality of recovery containers in a state where a movement range of the end material is limited.

16. The apparatus according to claim 1, further comprising a drain receiver disposed below the plurality of cages, and configured to receive the liquid discharged from the at least one surface of each of the plurality of cages and discharge the liquid from a drain port.

17. The apparatus according to claim 1, further comprising a plurality of weight sensors configured to measure weights of the plurality of recovery containers.

18. The apparatus according to claim 1, wherein the rotation drive mechanism rotates the plurality of cages around a center position or a center of gravity position of a side surface of each of the plurality of cages as an axis.

19. The apparatus according to claim 1, wherein the rotation drive mechanism rotates the plurality of cages around a bottom side position of each of the plurality of cages as an axis.

20. The apparatus according to claim 1, further comprising a partition plate disposed between the plurality of cages.

* * * * *